United States Patent [19]
Anai

[11] Patent Number: 6,128,045
[45] Date of Patent: Oct. 3, 2000

[54] FLAT-PANEL DISPLAY DEVICE AND DISPLAY METHOD

[75] Inventor: Kimio Anai, Hyogo-ken, Japan

[73] Assignee: Kabushiki Kaisha Toshiba, Kawasaki, Japan

[21] Appl. No.: 09/048,852

[22] Filed: Mar. 27, 1998

[30] Foreign Application Priority Data

Mar. 27, 1997 [JP] Japan ..................................... 9-075557

[51] Int. Cl.⁷ .................................................. H04N 5/46
[52] U.S. Cl. ........................... 348/556; 348/564; 348/792
[58] Field of Search .................................... 348/556, 792, 348/558, 555, 790, 441, 445, 913; 345/127, 55; H04N 5/46, 3/14

[56] References Cited

U.S. PATENT DOCUMENTS

| | | | |
|---|---|---|---|
| 5,357,290 | 10/1994 | Horibe | ..................................... 345/792 |
| 5,534,940 | 7/1996 | Sato et al. | ................................. 348/556 |
| 5,748,175 | 5/1998 | Shimada et al. | ......................... 345/127 |

*Primary Examiner*—Michael H. Lee
*Attorney, Agent, or Firm*—Oblon, Spivak, McClelland, Maier & Neustadt, P.C.

[57] ABSTRACT

A liquid crystal display device is composed of a liquid crystal panel including a plurality of pixels and a plurality of data signal lines, and a panel control unit CNT for controlling the liquid crystal panel so that a selected one of a high vision signal image and an NTSC signal image can be displayed. The control unit includes an auxiliary video signal generating circuit for generating an auxiliary video signal representing an auxiliary image to be displayed in first and second remainder areas provided on both sides of a display area for displaying an NTSC signal image on the screen of the liquid crystal panel. The control unit further includes a circuit for driving the data signal lines according to results obtained by sampling the auxiliary video signal in a horizontal blanking period of an NTSC video signal and the NTSC video signal in a period excluding the horizontal blanking period from one horizontal scanning period of the NTSC video signal.

24 Claims, 7 Drawing Sheets

FLAT-PANEL DISPLAY DEVICE AND DISPLAY METHOD

BACKGROUND OF THE INVENTION

The present invention relates to a flat-panel display device, and more particularly to a flat-panel display device and display method which can display images of different aspect ratios in an effective display area.

In recent years, as regards flat-panel display devices represented by a liquid crystal display device, a device whose effective display area has an aspect ratio of 9:16 has been developed.

For example, a video signal of an NTSC mode which has image information in an aspect ratio of 3:4 is used as an input signal to the flat-panel display devices, in addition to a video signal of a high vision mode (or EDTV II mode) which has image information in the aspect ratio of 9:16.

If a video signal having image information in the aspect ratio of 3:4 is input to the flat-panel display device whose effective display area has the aspect ratio of 9:16, the aspect ratio of 3:4 is deformed to the aspect ratio of 9:16, with the result that a horizontally expanded image is displayed in the overall effective display area.

Thus, the conventional display device merely has a so-called full display mode in which an image is displayed in the overall display area is effected completely irrespective of the aspect ratio assigned to the video signal. Therefore, the display device cannot display the image in the effective display area while maintaining the aspect ratio of 3:4, for example.

This is because predetermined non-display areas arranged horizontally must be provided in a case where a display operation of a video signal having image information in the aspect ratio of 3:4 is effected without changing the aspect ratio in the display area having the aspect ratio of 9:16. If the video signal having image information in the aspect ratio of 3:4 is sequentially sampled at normal sampling timings, samplings for the non-display areas cannot be completed within a blanking period of the video signal.

To cope with the circumstances, a liquid crystal display device as disclosed in Jpn. Pat. Appln. KOKAI Publication No. 6-27903 is known. The liquid crystal display device includes a signal line driving circuit for driving a plurality of data signal lines which are arranged in the horizontal direction for a matrix array of pixels constituting an effective display area. The signal line driving circuit has first to fourth driver ICs for dividing the data signal lines into blocks and driving the respective blocks of data signal lines. More specifically, the first to third driver ICs drive three blocks of data signal lines corresponding to the NTSC signal image display area, whereas the fourth driver IC drives one block of data signal lines corresponding to the remainder area.

By causing the fourth driver IC to operate while the first to third IC operate, video signals can be distributed to all the associated groups of data signal lines within each horizontal scanning period.

However, when the signal image display area is determined for a different aspect ratio, the display area has a restriction depending on the number of blocks divided by the driver ICs in the above structure. Therefore, the divisional number of blocks divided by the driver ICs must be increased to enhance its flexibility. This results in an increase of the cost.

BRIEF SUMMARY OF THE INVENTION

The present invention has been made to solve the above problem and its object is to provide a flat-panel display device and display method which can display signal images of various aspect ratios without increasing the cost and the area occupied by circuitry.

According to the present invention, there is provided a flat-panel display device which includes a display panel, having a plurality of pixels arranged in a matrix and a plurality of data signal lines for setting potentials of pixels in each row, for displaying an image corresponding to a potential distribution of the pixels; and a control section for controlling the display panel such that a first image corresponding to a first video signal is displayed in a first display mode and a second image corresponding to a second video signal is displayed in an aspect ratio lower than that of the first image in a second display mode; wherein the control section includes auxiliary video signal generating means for generating, in the second mode, an auxiliary video signal representing an auxiliary image to be displayed in a remainder area which corresponds to a difference between the aspect ratios of the first and second images and is determined to exclude a display area of the second image on a screen of the display panel; and signal line driving means for driving the data signal lines according to results of sampling obtained every horizontal scanning period by sampling the auxiliary video signal in a horizontal blanking period of the second video signal and the second video signal in a period excluding the horizontal blanking period from the horizontal scanning period.

With the flat-panel display device, the horizontal blanking period of the second video signal is used for causing samplings of the auxiliary video signal to be complete. Therefore, the display position of an image can be suitably determined without requiring a frame memory for image processing or the like.

DETAILED DESCRIPTION OF THE INVENTION

A liquid crystal display device according to an embodiment of the present invention will be described with reference to the drawings.

Figure 1:
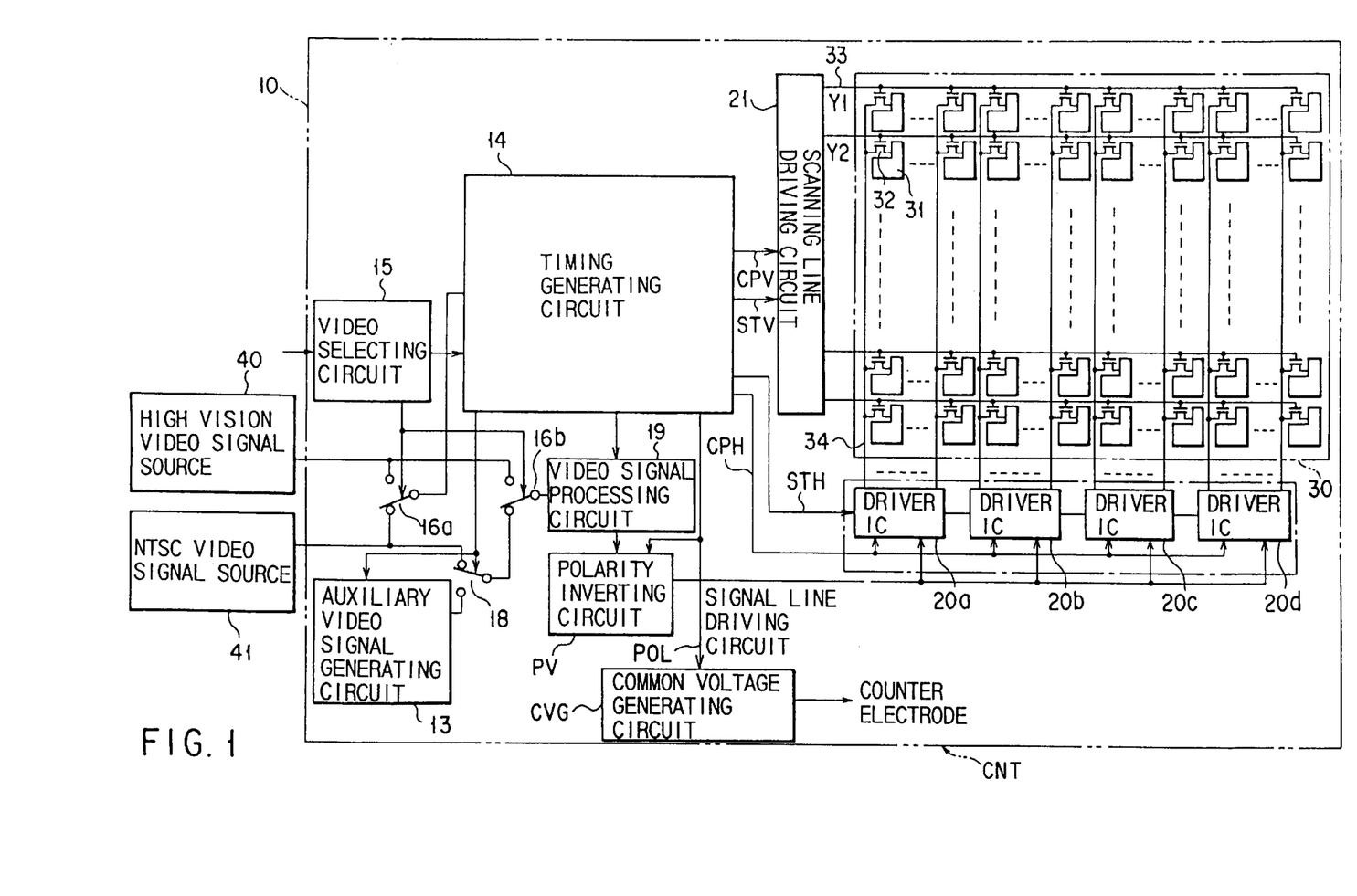
FIG. 1 is a diagram showing the circuit configuration of a liquid crystal display device according to an embodiment of the present invention.

FIG. 1 shows a circuit configuration of a liquid crystal display device 10.

The liquid crystal display device 10 is incorporated into, for example, a TV receiver, and connected to an external video signal source 40 for generating a high vision video signal representing an image of the aspect ratio of 9:16 along with a sync signal and an external video signal source 41 for generating an NTSC video signal representing an image of the aspect ratio of 3:4 along with a sync signal.

The liquid crystal display device 10 is composed of a liquid crystal display panel 30, in which the aspect ratio of an effective display area is set to 9:16, and a panel control unit CNT for controlling the liquid crystal display panel 30 based on the high vision video signal and the NTSC video signal.

Figure 2:
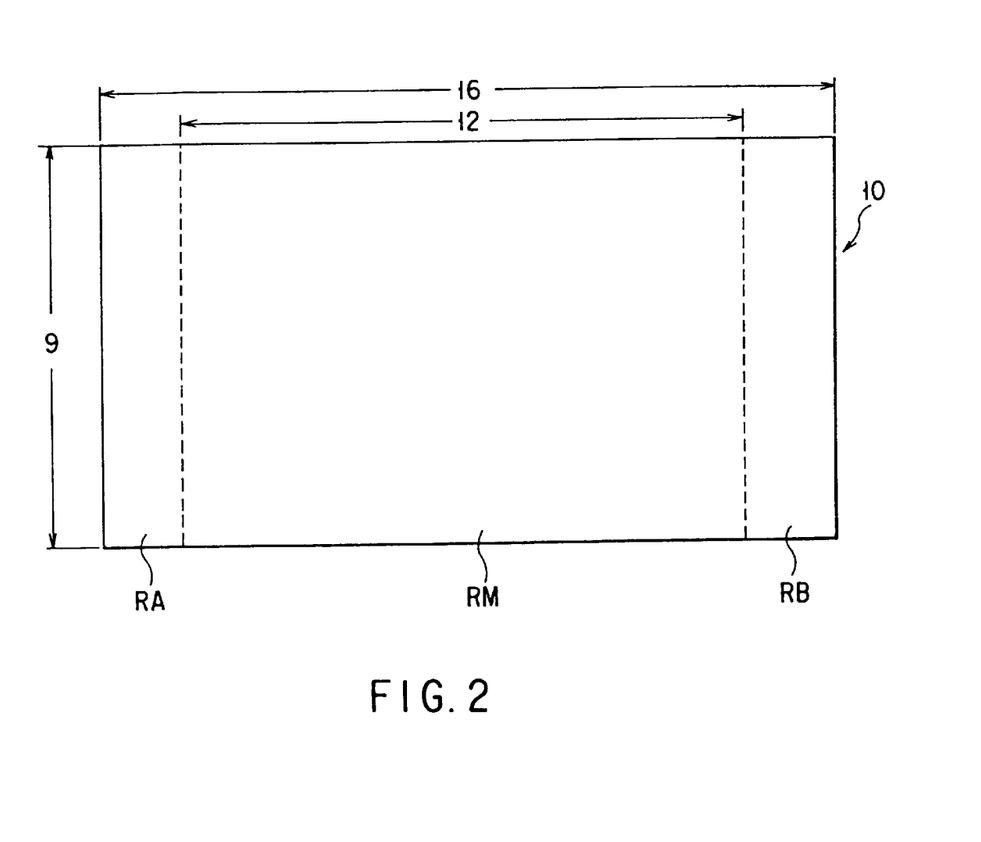
FIG. 2 is a diagram showing a plurality of areas obtained by partitioning the screen of the liquid crystal display panel of the liquid crystal display device shown in FIG. 1.

In the liquid crystal display device 10, a high vision signal image of the aspect ratio 9:16 can be displayed in the overall effective display area, and an NTSC signal image of the aspect ratio 3:4 can be displayed in the overall effective display area or displayed in a central portion of the effective display area, maintaining the aspect ratio 3:4. In the case where the NTSC signal image is displayed in a central portion of the effective display area, maintaining the aspect ratio 3:4, two remainder areas RA and RB are provided on both sides of the display area of the NTSC signal image, as shown in FIG. 2.

The liquid crystal display panel 30 is composed of an array substrate which includes a plurality of pixel electrodes 31 arranged in a matrix, a plurality of scanning lines 33 formed along the rows of the pixel electrodes 31 to transmit a scanning signal, a plurality of data signal lines 34 formed along the columns of the pixel electrodes 31, and a plurality of switching elements 32 formed of thin film transistors (TFTs) formed at positions corresponding to the intersections between the scanning lines 33 and the data signal lines 34; a counter substrate including a counter electrode opposing to the plurality of pixel electrodes 31; and a liquid crystal layer held between the array substrate and the counter substrate and serving as a light modulating layer. A TFT constituting each switching element 32 has a gate electrode connected to the scanning line 33, a drain electrode connected to the pixel electrode 31 and a source electrode connected to the data line 34.

The source and drain electrode path is made conductive by the scanning signal supplied through the scanning line 33, so that the potential of the data signal line set in accordance with the data signal can be applied to the pixel electrode 31.

The effective display area of the liquid crystal display panel 30 includes a plurality of display pixels each constituted by the pixel electrode 31, the counter electrode and that part of the liquid crystal layer which is interposed between the pixel electrode 31 and the counter electrode. Light transmittance of each display pixel is controlled by a potential difference between the pixel electrode 31 and the counter electrode.

The panel control unit CNT includes an auxiliary video signal generating circuit 13, a timing generating circuit 14, a video selecting circuit 15, a first switch circuit 16a, a second switch circuit 16b, a third switch circuit 18, a video signal processing circuit 19, a signal line driving circuit 20, a scanning line driving circuit 21, a polarity inverting circuit PV and a common voltage generating circuit CVG.

The video signal processing circuit 19 performs video signal processes, such as gamma correction, in order to suitably drive the liquid crystal display panel 30.

The scanning line driving circuit 21 performs a driving operation of sequentially supplying a scanning signal to the scanning lines 33. The scanning line driving circuit 21 includes a shift register circuit constituted by a plurality of flip-flops assigned to the scanning lines 33 and connected in series to transmit a vertical start signal STV. The shift register circuit effects a shifting operation of the vertical start signal STV in response to a vertical scanning clock signal CPV, to supply a scanning signal to the scanning line 33 corresponding to the flip-flop which has latched the vertical start signal STV.

The signal line driving circuit 20 sequentially sample-holds the video signal supplied from the video signal processing circuit 19 for the data signal lines 34, and drives the data signal lines 34 in accordance with the sample-held data signals. The signal line driving circuit 20 includes first to fourth driver ICs 20a to 20d, which have the same structure and respectively drives four blocks of the data signal lines 34. The number of data signal lines of one block is determined independent of the remainder areas RA and RB provided on both sides of the NTSC signal image display area in the effective display area of the liquid crystal panel 30. The first to fourth drivers IC 20a to 20d are connected in series to transmit a horizontal start signal STH. Each driver IC has at least one shift register constituted by a plurality of flip-flops connected in series for one block of the data signal lines 34. Each shift register performs a shifting operation of the horizontal start signal STH in response to a sampling clock signal CPH. The first to fourth drivers IC 20a to 20d sample-holds the video signal at the timing that each flip-flop outputs the horizontal start signal STH, and supply it as a data signal to the data signal line 34 corresponding to the flip-flop.

The auxiliary video signal generating circuit 13 generates an auxiliary video signal representing an auxiliary image, such as CHANNEL information, to be displayed in the remainder areas RA and RB, by utilizing the horizontal blanking period of the NTSC video signal. The video selecting circuit 15 is controlled, for example, by an external input to perform an operation of outputting a selection signal for selecting the high vision video signal or NTSC video signal, and an operation of selecting a full display mode for the display in the overall effective display area or a centering display mode for the display of the 3:4 aspect ratio in a central portion of the effective display area to output a mode signal corresponding to the selection result to the timing generating circuit 14.

Under the control of the mode signal, the timing generating circuit 14 controls the auxiliary video signal generating circuit 13, the switch circuit 18, the video signal processing circuit 19, the scanning line driving circuit 21 and the signal line driving circuit 20 at timings corresponding to the selected mode.

The switch circuit 16a is controlled by the selection signal, such that horizontal and vertical sync signals from the high vision video signal are supplied to the timing generating circuit 14 upon selection of the high vision video signal, and horizontal and vertical sync signals from the NTSC video signal are supplied to the timing generating circuit 14 upon selection of the NTSC video signal. Similarly, the switch circuit 16b supplies the high vision video signal to the video signal processing circuit 19 upon selection of the high vision signal, and the NTSC video signal to the video signal processing circuit 19 upon selection of the NTSC video signal.

When the NTSC video signal is selected and the mode signal corresponds to the full display mode, the switch circuit 18 causes the NTSC video signal to be supplied to the video signal processing circuit 19 through the switch circuit 16b. When the NTSC video signal is selected and the mode signal corresponds to the centering display mode, the switch circuit 18 assigns the auxiliary video signal representing an auxiliary image supplied from the auxiliary video signal generating circuit 13 to the horizontal blanking period of the NTSC video signal, and causes a multiplexed video signal thus obtained to be supplied to video signal processing circuit 19 through the switch circuit 16b.

The common voltage generating circuit CVG generates a common voltage VCOM, whose level is inverted with respect to a reference voltage, in every horizontal scanning period and every vertical scanning period under the control of a polarity inversion signal POL supplied from the timing generating circuit 14. The common voltage VCOM is supplied to the counter electrode.

In synchronism with the level inversion of the common voltage VCOM, the polarity inverting circuit PV level-inverts the high vision video signal, NTSC video signal or multiplexed video signal supplied from the video signal processing circuit 19 with respect to the reference voltage in an opposite phase, and outputs the level-inverted signal. As a result, the polarity of voltage applied to the liquid crystal is periodically inverted.

Figure 3:
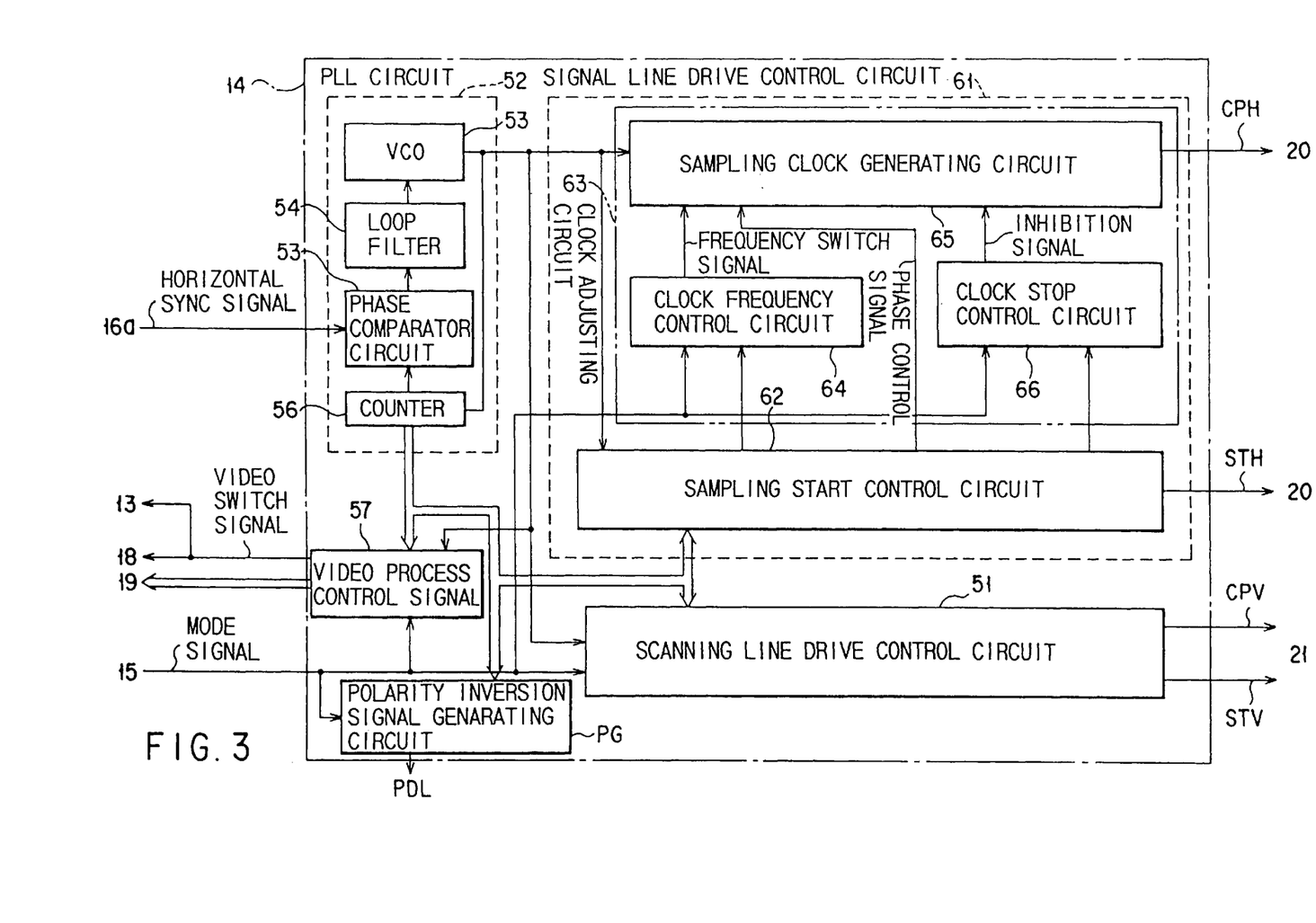
FIG. 3 is a diagram showing the circuit configuration of the timing generating circuit shown in FIG. 1.

FIG. 3 shows in detail the circuit configuration of the timing generating circuit 14. The timing generating circuit 14 includes a PLL circuit 52, a scanning line drive control circuit 51, a signal line drive control circuit 61, an image process control circuit 57, and a polarity inversion signal generating circuit PG.

The PLL circuit 52 is composed of a phase comparator circuit 53, a loop filter 54, a voltage controlled oscillator (VCO) 55 and a counter 56. In the PLL circuit 52, the phase comparator circuit 53 detects a phase difference between a horizontal sync signal supplied through the switch circuit 16a and a reference horizontal clock signal supplied from the counter 56, and generates an error signal corresponding to the phase difference. The loop filter 54 generates a signal voltage obtained by removing a high-frequency component and noise from the error signal supplied from the phase comparator circuit 53. The VCO 55 generates a pulse signal of an oscillation frequency corresponding to the signal voltage obtained from the loop filter 54 as a reference sampling clock signal. The counter 56 counts clocks of the reference sampling clock signal by the number of pixels in one row to divide the frequency of the reference sampling clock signal according to the number of pixels, and outputs the frequency-divided signal as the reference horizontal clock signal to the phase comparator circuit 53. The reference horizontal clock signal and the reference sampling clock signal are supplied to the scanning line drive control circuit 51, the signal line drive control circuit 61 and the image process control circuit 57.

The video process control circuit 57 controls the auxiliary video signal generating circuit 13, the switch circuit 18 and the video signal processing circuit 19 based on the mode signal from the video selecting circuit 15 and the reference horizontal clock signal from the counter circuit 56. In the centering display mode, the video switch signal is supplied from the control circuit 57 to the auxiliary video signal generating circuit 13 and the switch circuit 18 to enable the auxiliary video signal during the horizontal blanking period of the NTSC video signal.

The polarity inversion signal generating circuit PG generates a polarity inversion signal POL to be supplied to the polarity inverting circuit PV and the common voltage generating circuit CVG. The polarity inversion signal POL is a signal which is level-inverted in every horizontal scanning period and every vertical scanning period based on the mode signal from the video selecting circuit 15 and the reference horizontal clock signal from the counter 56, in order to periodically invert the polarity of the voltage applied to the liquid crystal.

The scanning line drive control circuit 51 generates a vertical start signal STV in synchronism with the horizontal start signal STH in every frame period based on the mode signal from the video selecting circuit 15 and the reference horizontal clock signal form the counter 56, generates a vertical scanning clock signal CPV in every horizontal scanning period, and supplies the generated signals as control signals to the scanning line driving circuit 21.

The signal line drive control circuit 61 controls the signal line driving circuit 20 based on the mode signal from the video selecting circuit 15 and the reference horizontal clock signal from the counter 56. The signal line drive control circuit 61 includes a sampling start control circuit 62 for controlling the start timing of sampling of a video signal, and a clock adjusting circuit 63 for adjusting the reference sampling clock signal supplied from the PLL circuit 52. In the sampling start control circuit 62, the horizontal start signal STH and control signals, such as a phase control signal, are generated at predetermined timings in synchronism with the reference horizontal clock signal supplied from the counter 56. The predetermined timings are confirmed with reference to the number of clocks of the reference sampling clock signal supplied from the PLL circuit 52. The clock adjusting circuit 63 includes a sampling clock generating circuit 65 which generates a sampling clock signal CPH of a first or second frequency from the reference sampling clock signal, a clock frequency control circuit 64 which generates a frequency switch signal for controlling the switching of the first and second frequencies under the control of the sampling start control circuit 62, and a clock stop control circuit 66 which generates an inhibition signal to temporality stops the sampling clock signal CPH under the control of the sampling start control circuit 62. The first frequency is a sampling frequency in the full display mode, and the second frequency is a frequency in the centering display mode. The frequency switch signal selects the first frequency in the full display mode. In the centering display mode, the frequency switch signal selects the first frequency in the horizontal blanking period of the NTSC video signal, and the second frequency in the period excluding the horizontal blanking period from one horizontal scanning period of the NTSC video signal. The inhibition signal is not generated in the full display mode, but generated in the centering display mode in a period corresponding to a frequency transit period of the sampling clock signal CPH. Thus, in the sampling clock generating circuit 65, the frequency of the sampling clock signal CPH is switched in a duration of the inhibition signal in accordance with the frequency switch signal. At this time, the phase of the sampling clock signal CPH is suitably adjusted by the phase control signal from the sampling start control circuit 62.

A description of the structure of the sampling clock generating circuit 65 will now be supplemented. In this liquid crystal display device, the high vision video signal or NTSC video signal is displayed as an image of the aspect ratio 9:16 in the overall screen as shown in FIG. 2 in the full display mode. In the centering display mode, the NTSC video signal is displayed as an image of the aspect ratio 3:4 in the display area RM as shown in FIG. 2.

One horizontal scanning period (1H) is common to both the full display mode and the centering display mode, and samplings for the number of pixels corresponding to the effective display area must be effected within one horizontal scanning period (1H). Particularly in the centering display mode, it is necessary to effect not only the samplings for the number of the pixels corresponding to the aspect ratio of the NTSC video signal, but also the samplings for the auxiliary video signal in the blanking period.

For this reason, the sampling frequency f1 in the full display mode and the sampling frequency f2 in the centering display mode have the following relationship:

$$2 \times f1 = 4 \times f2 \quad (1).$$

Since one horizontal scanning period (1H) includes a horizontal blanking period, a period T1 excluding the horizontal blanking period is a substantial sampling period. The sampling period T1 is expressed, for example, as follows:

$$T1 = 0.8H \quad (2).$$

In the centering display mode, the auxiliary video signal is displayed as left- and right-side auxiliary images respectively in the remainder areas RA and RB provided on both sides of the NTSC signal image display area. The auxiliary video signal must be sampled for the number of pixels corresponding to the aspect ratio in a 0.2H blanking period. The number of pixels is equal to the sum of the product of a sampling period T2 and a sampling frequency f3 for the auxiliary video signal representing a left-side auxiliary image and the product of a sampling period T3 and a sampling frequency f4 for the auxiliary video signal representing a right-side auxiliary image. The relationship between this number of pixels and the number of pixels corresponding to the product of the sampling period T1 and the sampling frequency f2 for the NTSC video signal is the same as the relationship between the aspect ratio of the sum of the remainder areas RA and RB and the aspect ratio of the display area RM, as expressed by the following equation:

$$T1 \times f2 : T2 \times f3 \times T3 \times f4 = 12 : 4 \quad (3).$$

When 0.8 is substituted for T1, the equation is rearranged as follows:

$$T2 \times f3/f2 + T3 \times f4/f2 = 0.8H/3 \quad (4).$$

To satisfy the equation (4), the sampling frequency f3 for the auxiliary video signal representing the left-side auxiliary image and the sampling frequency f4 for the auxiliary video signal representing the right-side auxiliary image must be higher than the sampling frequency f2 for the NTSC video signal. The sampling clock generating circuit 65 shown in FIG. 3 is constructed such that the sampling frequencies f3 and f4 need not be generated independently.

Figure 4:
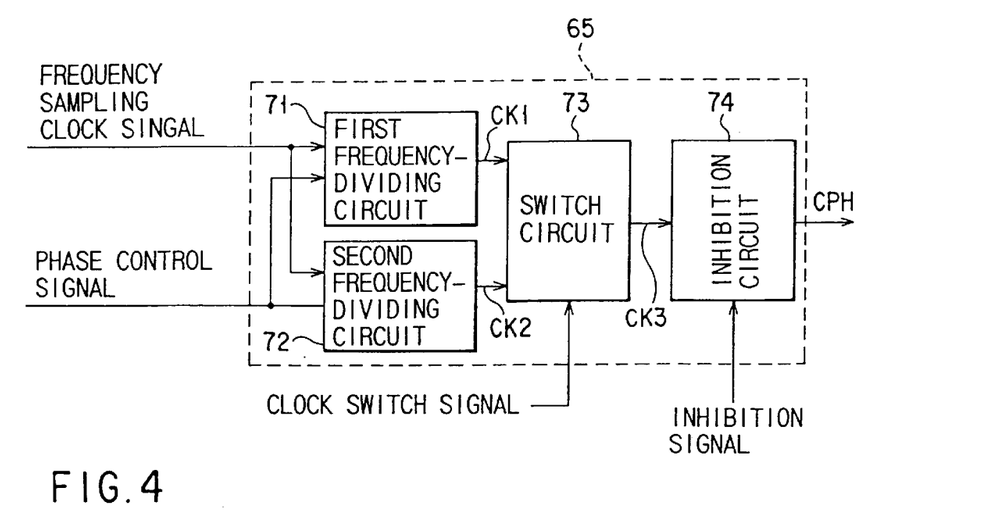
FIG. 4 is a diagram showing the circuit configuration of the sampling clock generating circuit shown in FIG. 3.
Figure 5:
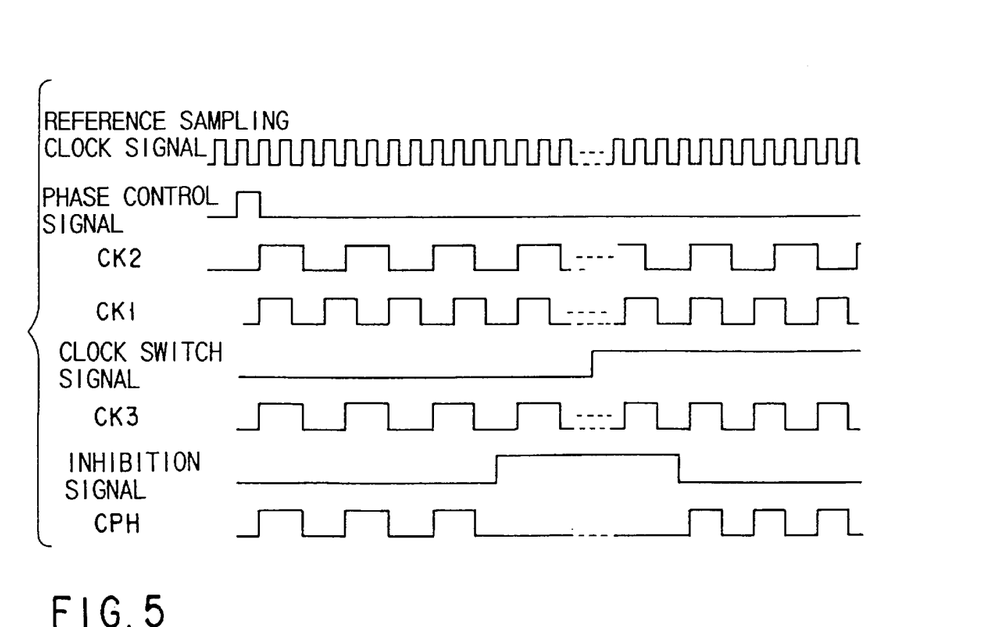
FIG. 5 is a timing chart for explaining an operation of the sampling clock generating circuit shown in FIG. 4.

FIG. 4 shows a more detailed circuit configuration of the sampling clock generating circuit 65, and FIG. 5 shows signals obtained in the sampling clock generating circuit 65. In the sampling clock generating circuit 65, the first frequency is used as the sampling frequency f1 in the full display mode, and the second frequency is used as the sampling frequency f2 for the NTSC video signal in the centering display mode. Further, since the first frequency is set higher than the second frequency, it is also used as sampling frequencies f3 and f4 of the auxiliary video signal. The sampling clock generating circuit 65 includes a first frequency-dividing circuit 71, a second frequency-dividing circuit 72, a switch circuit 73, and an inhibiting circuit 74. The first frequency-dividing circuit 71 frequency-divides the reference sampling clock signal into a clock signal CK1 of the first frequency, and the second frequency-dividing circuit 72 frequency-divides the reference sampling clock signal into a clock signal CK2 of the second frequency. In the first frequency dividing circuit 71 and the second frequency dividing circuit 72, the phases of the clock signals CK1 and CK2 are controlled by the phase control signal from the sampling start control circuit 62. The switch circuit 73 switches the clock signal CK1 and the clock signal CK2 in accordance with a clock switch signal from the clock frequency control circuit 64, and outputs an output clock signal CK3. The inhibiting circuit 74 masks the output clock signal CK3 obtained from the switch circuit 73 and outputs it as the sampling clock signal CPH.

An operation of the aforementioned liquid crystal display device will now be described.

When the video selecting circuit 15 selects the full display mode for the high vision video signal, the horizontal sync signal for the high vision video signal is supplied to the timing generating circuit 14 through the switch circuit 16a. At the same time, the high vision video signal is supplied to the video signal processing circuit 19 through the switch circuit 16b. When the video selecting circuit 15 selects the centering display mode for the NTSC video signal, the horizontal sync signal for the NTSC video signal is supplied to the timing generating circuit 14 through the switch 16a. At the same time, a multiplexed video signal including the NTSC video signal and the auxiliary video signal is supplied to the video signal processing circuit 19 through the switch circuit 16b.

The timing generation circuit 14 generates a reference sampling clock signal from the horizontal sync signal, generates a horizontal clock signal from the reference sampling clock signal, and controls the scanning line driving circuit 21 and the signal line driving circuit 20 in every horizontal scanning period defined by the horizontal clock signal. When controlling the signal line driving circuit 20, a horizontal start signal STH is generated from the horizontal clock signal, and a sampling clock signal CPH is generated from the reference sampling clock signal. The scanning line driving circuit 21 sequentially drives the scanning lines 33 in one vertical scanning period. In each horizontal scanning period, a scanning signal is continuously supplied to the corresponding scanning line 33. The signal line driving circuit 20 drives the signal lines 33 corresponding to video signals supplied from the video signal processing circuit 19 within one horizontal scanning period. In the driver ICs 20a to 20d, the shift register performs a shifting operation of the horizontal start signal STH in response to the sampling clock signal CPH. The high vision video signal is sample-held as a data signal at the timing when the horizontal start signal STH is stored in and output from each flip-flop, and supplied to the data signal line 34 corresponding to the flip-flop.

As a result, in the high vision mode, a high vision signal image of the aspect ratio 9:16 is displayed on the overall screen of the liquid crystal panel 30 shown in FIG. 2.

In the centering display mode for the NTSC video signal, an NTSC signal image of the aspect ratio 3:4 is displayed on the display area RM shown in FIG. 2 and a left-side auxiliary image and a right-side auxiliary image are displayed in the remainder areas RA and RB shown in FIG. 2.

Figure 6:
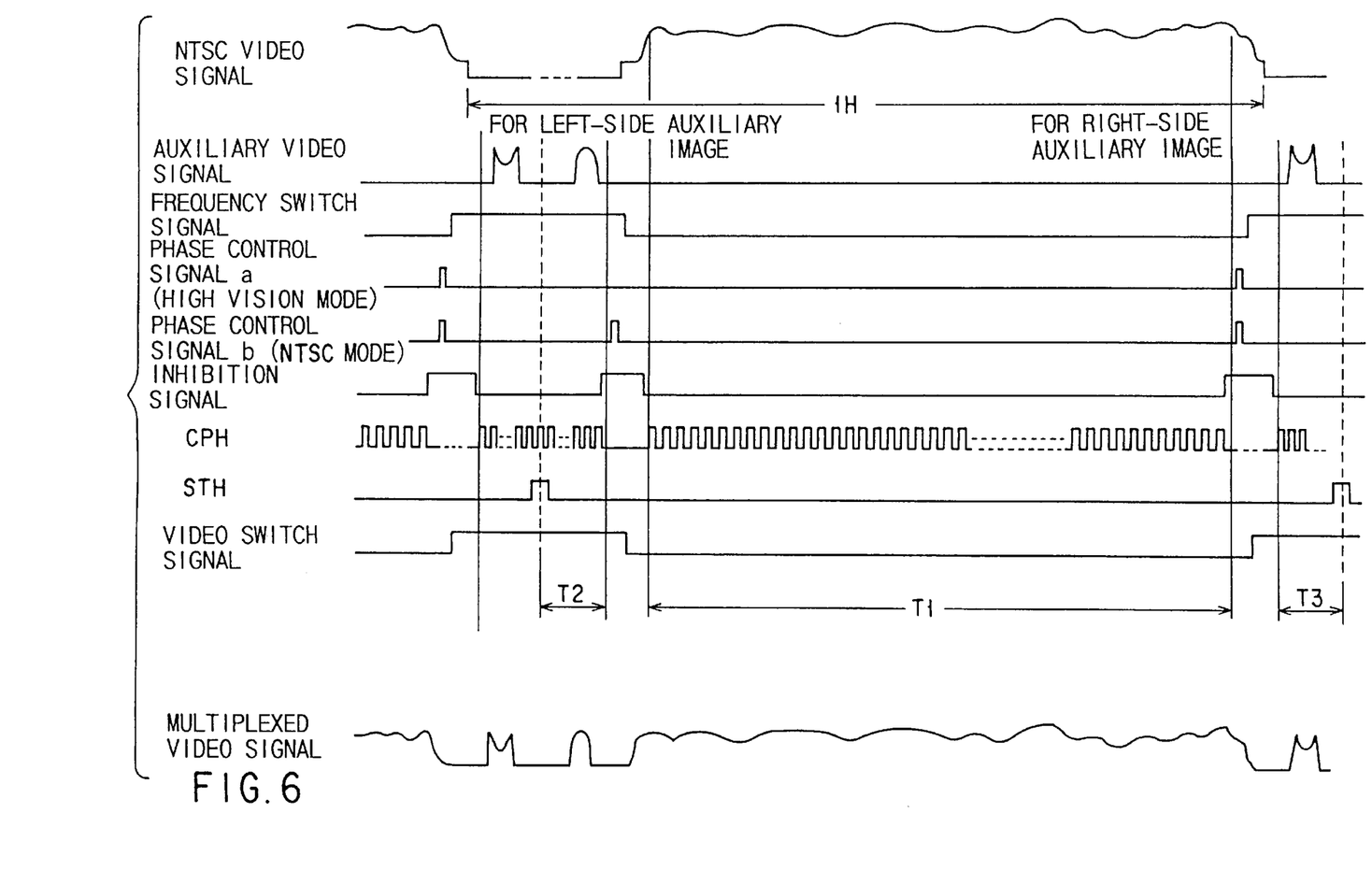
FIG. 6 is a timing chart for explaining an NTSC mode operation of the liquid crystal display device shown in FIG. 1.

The NTSC mode operation will be described more specifically with reference to FIG. 6.

The timing generating circuit 14 generates a video switch signal for the horizontal blanking period of the NTSC video signal in the centering display mode.

The switch circuit 18 outputs the auxiliary video signal supplied from the auxiliary video signal generating circuit 13 to the switch 16b under the control of the video switch signal. While the video signal processing circuit 19 is processing to output the auxiliary video signal, the horizontal start signal STH and the sampling clock signal CPH of the first frequency are supplied from the timing generating circuit 14 to the signal line driving circuit 20. In the signal line driving circuit 20, sampling of the auxiliary video signal representing the left-side auxiliary image is performed in response to the sampling clock signal CPH of the first frequency after the horizontal start signal STH is supplied, so that data signals for the number of data signal lines 34 corresponding to the remainder area RA are generated and supplied to the data signal lines 34. When the sampling for the last one of the data signal lines 34 corresponding to the remainder area RA is completed, the inhibition signal is supplied from the clock stop control circuit 66 to the sampling clock generating circuit 65, and the sampling clock signal CPH is stopped for a predetermined period. In this period, the phase control signal and the frequency switch signal are respectively supplied from the sampling start control circuit 62 and the clock frequency switch circuit 64 to the sampling clock generating circuit 65, and the video switch signal is changed to switch the auxiliary video signal to the NTSC video signal.

Upon change in the video switch signal, the switch circuit 18 outputs the NTSC video signal from the NTSC video signal generating source 41 to the switch 16$b$, and the video signal processing circuit 19 processes and outputs the NTSC video signal. When supply of the inhibition signal is stopped upon output of the NTSC video signal, the sampling clock generating circuit 65 starts generation of the sampling clock signal CPH of the second frequency. In the signal line driving circuit 20, sampling of the NTSC video signal is performed in response to the sampling clock signal CPH of the second frequency, and data signals for the number of data signal lines 34 corresponding to the display area RM are generated and supplied to the data signal lines 34. When the sampling for the last one of the data signal lines 34 corresponding to the display area RM is completed, the inhibition signal is supplied again from the clock stop control circuit 66 to the sampling clock generating circuit 65, and the sampling clock signal CPH is stopped for a predetermined period. In this period, a phase control signal and a frequency switch signal are respectively supplied from the sampling start control circuit 62 and the clock frequency switch circuit 64 to the sampling clock generating circuit 65, and the video switch signal is changed to switch the NTSC video signal to the auxiliary video signal.

Upon change in the video switch signal, the switch circuit 18 outputs the auxiliary video signal from the auxiliary video signal generating circuit 13 to the switch 16$b$, and the video signal processing circuit 19 processes and outputs the auxiliary video signal. When supply of the inhibition signal is stopped upon output of the auxiliary video signal, the sampling clock generating circuit 65 starts generating the sampling clock signal CPH of the first frequency. In the signal line driving circuit 20, sampling of the auxiliary video signal representing the right-side auxiliary image is performed in response to the sampling clock signal CPH of the first frequency, and data signals for the number of data signal lines 34 corresponding to the remainder area RB are generated and supplied to the data signal lines 34. Subsequently, a sampling operation of the auxiliary video signal representing a left-side auxiliary image is performed. Then, the above operations are repeated.

In this manner, the left-side remainder image is displayed in the remainder area RA by the sampling operation in the period T2, the NTSC signal image is displayed in the display area RM by the sampling operation in the period T1, and the right-side remainder image is displayed in the remainder area RB by the sampling operation in the period T3.

In the liquid crystal display device of the above embodiment, the NTSC video signal is sampled in synchronism with the sampling clock signal CPH of the second frequency, and the auxiliary video signal is sampled in synchronism with the sampling clock signal CPH of the first frequency higher than the second frequency. Therefore, the sampling of the auxiliary video signal can be completed, utilizing the horizontal blanking period of the NTSC video signal. For this reason, the signal line driving circuit need not drive the data signal lines 34 corresponding to the remainder areas RA and RB provided on both sides of the display area RM of the NTSC signal image, independently of the data signal lines corresponding to the display area RM of the NTSC signal image. Consequently, the number of data signal lines in one block driven by each of the driver ICs 20$a$ to 20$d$ can be determined independently of the number of data signal lines corresponding to the remainder areas RA and RB. Therefore, in the liquid crystal display device, when an image of a high aspect ratio is switched to an image of a low aspect ratio, the center of the image of the low aspect ratio can easily coincide with the center of the image of the high aspect ratio, so that a person who watches the display may not feel something wrong. Further, the structure of the liquid crystal display device does not require that the area occupied by the circuit and the cost be increased, depending on the number of driver ICs.

Moreover, since the sampling clock signal CPH of the first frequency is a signal for use in the full display mode, an independent sampling clock generating circuit is not required to sample the auxiliary video signal.

Furthermore, since the sampling clock generating circuit 65 is controlled by the clock inhibition control circuit 66 to temporarily stop generating the sampling clock signal CPH in a period required to switch the clock frequency, the sampling clock signal CPH can be set to a phase suitable for sampling the video signal in that period.

In the liquid crystal display device of the above embodiment, switching between the full display mode and the centering display mode can be performed on the basis of a mode signal supplied from the video selecting circuit 15. However, the display area RM of the aspect ratio 3:4 for the NTSC video signal can be set to various positions by increasing the number of settings in the timing generation circuit 14.

Figure 7:
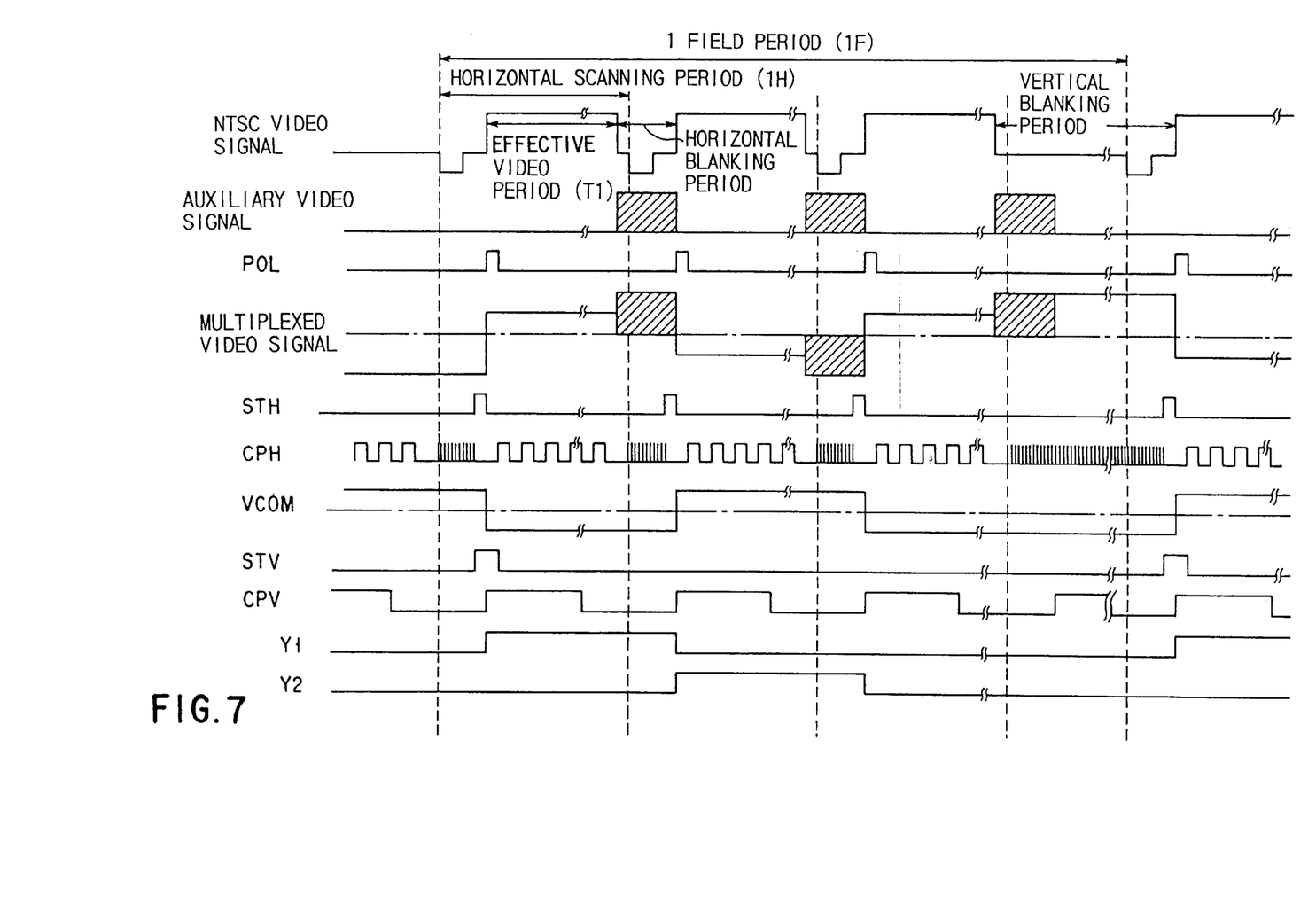
FIG. 7 shows an operation of the liquid crystal display device when the leftmost position is selected.

For example, FIG. 7 shows an operation of the liquid crystal display device when the leftmost position is selected.

In this operation, the horizontal start signal STH is generated from the signal line drive control circuit 61 at a timing of completion of the horizontal blanking period prior to the effective video period of the NTSC video signal. The vertical start signal STV is generated from the scanning line drive control circuit 51 at a timing of generating the initial one of the initial horizontal start signals STH in each frame period. The polarity inversion signal POL is generated from the polarity inversion signal generating circuit PG at a timing of starting the effective video period of the NTSC video signal.

Figure 8:
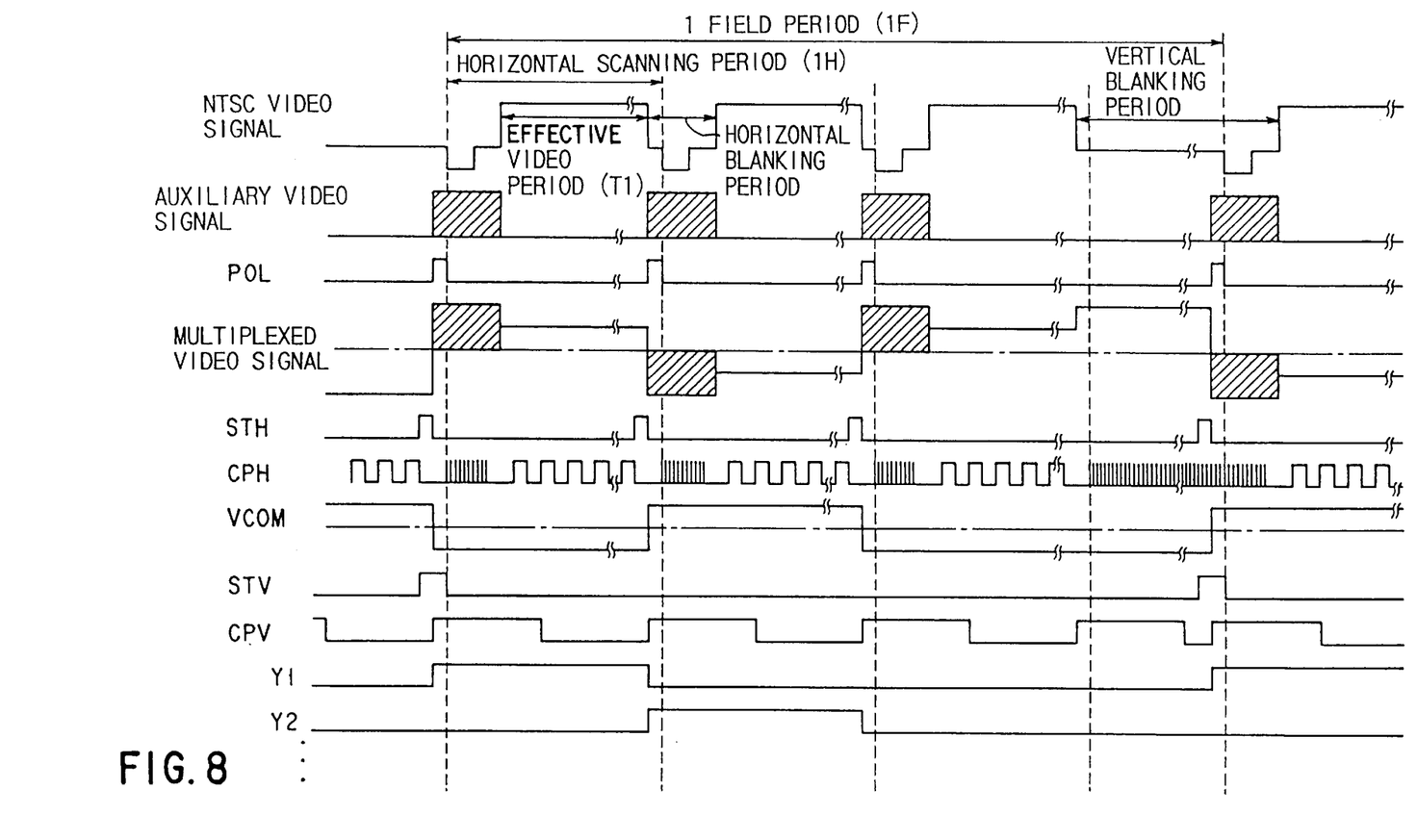
FIG. 8 shows an operation of the liquid crystal display device when the rightmost position is selected.

FIG. 8 shows an operation of the liquid crystal display device when the rightmost position is selected.

In this operation, the horizontal start signal STH is generated from the signal line drive control circuit 61 at a predetermined timing slightly prior to a period in which the auxiliary video signal is generated. The vertical start signal STV is generated from the scanning line drive control circuit 51 at a timing of generating the initial one of the initial horizontal start signals STH in each frame period. The polarity inversion signal POL is generated from the polarity inversion signal generating circuit PG at a timing of starting the horizontal blanking period prior to the effective video period of the NTSC video signal.

According to the modification described above, the display position of the NTSC signal image is not only fixed to the central portion, but can be changed to the rightmost position or leftmost position. Further, the image can be displayed in a desired position in the horizontal direction by adjusting the timing of generating the horizontal start signal STH or the like.

In addition, since the scanning line drive control circuit 51, the signal line drive control circuit 61, the video process control circuit 57 and the polarity inversion signal generating circuit PG perform timing adjustment suitable for the display position of the NTSC signal image, a display defect can be prevented from occurring due to a change in the display position.

The present invention is not limited to the above embodiment, but can be modified variously without departing from the spirit and scope of the invention.

In the above embodiment, the sampling frequency is common to the sampling in the full display mode and the sampling of the auxiliary video signal in the centering display mode; however, it is possible that different frequencies can be prepared. More specifically, the sampling frequency for the auxiliary video signal in the centering display mode, or the leftmost or rightmost display mode can be set higher, so that the sampling switching period can be set sufficiently long. As a result, a satisfactory display image can be obtained. In this case, the effective video period of the auxiliary video signal must be determined according to the sampling period.

Further, since the sampling start position is set based on the reference sampling clock signal as described above, the setting can be kept unchanged, regardless of the display mode.

The aspect ratio for the centering display mode in the above embodiment is an example applicable to the NTSC video signal, and various aspect ratios are available.

According to the present invention, the display panel has an effective display area of a size corresponding to an image of a high aspect ratio, and applied to a display mode for displaying an image of a lower aspect ratio than the aspect ratio in a desirable position of the screen and displaying the auxiliary image in the remainder area.

If there is little difference between the aspect ratio of a high-aspect ratio image and that of a low-aspect ratio image, it is necessary to generate a sampling clock signal for the auxiliary video signal, which has a frequency sufficiently higher than the first and second frequencies of sampling clock signal CPH for the video signals of those images.

Further, if the remainder areas RA and RB are relatively large in the horizontal direction, a plurality of driver ICs may be provided for each of the remainder areas RA and RB, so that a driver IC corresponding to a part of the remainder area RA and a driver IC corresponding to a part of the remainder area RB can be driven simultaneously, when the high aspect ratio image display mode is switched to the low aspect ratio image display mode. However, since the driver ICs sample the same auxiliary video signal, it is necessary that the auxiliary video signal represents a background other than a character or figure. In this structure, the sampling frequency for the auxiliary video signal can be set to the sampling frequency for the video signal representing a low-aspect ratio image. For example, if the sampling frequency for the auxiliary video signal coincides with the sampling frequency for the NTSC video signal, the sum of the sampling periods of auxiliary video signals can be about 0.067H. However, since this increases the number of driver ICs and makes the peripheral circuit complex, it is advisable to use another combination of aspect ratios.

What is claimed is:

1. A flat-panel display device comprising:
   a display panel having a matrix array of pixels serving as a screen and a plurality of data signal lines formed to set potentials of the pixels of each row for displaying an image on the screen according to the potentials of the pixels; and
   control means connected to receive a first video signal representing a first image and a second video signal representing a second image of an aspect ratio lower than that of the first image and for controlling the display panel such that the first image is displayed in a first display mode and the second image is displayed in a second display mode;
   wherein the control means includes,
      auxiliary video signal generating means for generating an auxiliary video signal representing an auxiliary image to be displayed on at least one side of the second image within the screen of the display panel in the second display mode, and
   signal line driving means for driving the data signal lines according to sampling results obtained by sampling the second video signal and the auxiliary video signal during every horizontal scanning period for the second video signal, the auxiliary video signal being sampled in a horizontal blanking period included in the horizontal scanning period and not used for sampling the second video signal.

2. The flat-panel display device according to claim 1, wherein the signal line driving means includes sampling means for sampling the auxiliary video signal at a frequency higher than that of the second video signal.

3. The flat-panel display device according to claim 2, wherein a sampling frequency of the auxiliary video signal is equal to a sampling frequency of the first video signal when the first video signal represents the first image of an aspect ratio of 9:16 and the second video signal represents the second image of an aspect ratio of 3:4.

4. The flat-panel display device according to claim 1, wherein the signal line driving means includes sampling clock signal generating means for generating a sampling clock signal which is set at the first frequency to sample the auxiliary video signal and at the second frequency to sample the second video signal, and sampling means for sampling each of the auxiliary video signal and the second video signal in response to a corresponding sampling clock signal generated from the sampling clock generating means.

5. The flat-panel display device according to claim 4, wherein the sampling clock signal generating means includes reference sampling clock generating means for generating a reference sampling clock signal, first frequency-dividing means for frequency-dividing the reference sampling clock signal into a sampling clock signal of the first frequency, second frequency-dividing means for frequency-dividing the reference sampling clock signal to a sampling clock signal of the second frequency, and clock switch means for switching the sampling clock signal of the first frequency obtained by the first frequency-dividing circuit and the sampling clock signal of the second frequency obtained by the second frequency-dividing circuit.

6. The flat-panel display device according to claim 5, wherein the sampling clock generating means includes clock stop means for temporarily stopping supply of the sampling clock signal obtained by the clock switch means to the sampling means in accordance with a frequency transit period.

7. The flat-panel display device according to claim 1, wherein the signal line driving means includes video signal switch means for multiplexing the second video signal and the auxiliary video signal in a time-sharing manner in the second display mode.

8. The flat-panel display device according to claim 1, wherein the control means includes a positioning section for determining a position of the display area of the second image and sampling timing adjusting means for adjusting a sampling start timing of the signal line driving means in accordance with the position determined by the positioning section.

9. The flat-panel display device according to claim 8, wherein the positioning section includes a selecting section for selecting one of a leftmost position, a rightmost position and a center position as the position of the display area of the second image.

10. The flat-panel display device according to claim 8, wherein the control means includes:
- a common voltage generating circuit for generating a common voltage level-inverted in at least every horizontal scanning period and serving as a reference voltage for the pixels;
- a level inverting circuit for level-inverting the second video signal and the auxiliary video signal in synchronism with level inversion of the common voltage generated from the common voltage generating circuit; and
- an inversion timing adjusting means for adjusting a level inversion timing of the common voltage generated from the common voltage generating circuit in accordance with the position determined by the positioning section.

11. A flat-panel display device comprising:
- a display panel having a matrix array of pixels serving as a screen and a plurality of data signal lines formed to set potentials of the pixels of each row for displaying an image on the screen according to the potentials of the pixels; and
- control means connected to receive a main video signal representing a main image of an aspect ratio of lower than that of the screen of said display panel and for controlling the display panel such that the main image is displayed;
- wherein the control means includes,
   - auxiliary video signal generating means for generating an auxiliary video signal representing an auxiliary image to be displayed along with the main image within the screen of said display panel,
   - signal line driving means for driving the data signal lines according to sampling results obtained by sampling the main video signal and the auxiliary video signal in every horizontal scanning period for the main video signal, the auxiliary video signal being sampled in a horizontal blanking period included in the horizontal scanning period and not used for sampling the main video signal;
   - a positioning section for determining a display position of the main image, and
   - a sample timing adjusting means for adjusting sampling start timing of said signal line driving means in according with the display position determined by the positioning section.

12. The flat-panel display device according to claim 11, wherein the positioning section includes a selecting section for selecting one of a leftmost position, a rightmost position and a center position as the position of the display area of the main image.

13. The flat-panel display device according to claim 11, wherein the control means includes:
- a common voltage generating circuit for generating a common voltage level-inverted in at least every horizontal scanning period and serving as a reference voltage for the pixels;
- a level inverting circuit for level-inverting the main video signal and the auxiliary video signal in synchronism with level inversion of the common voltage generated from the common voltage generating circuit; and
- an inversion timing adjusting means for adjusting a level inversion timing of the common voltage generated from the common voltage generating circuit in accordance with the display position determined by the positioning section.

14. A flat-panel display device comprising:
- a display panel including rows of horizontal display pixels serving as an effective display screen of a predetermined aspect ratio and a plurality of data signal lines formed to set potentials of the pixels of each row; and
- a data signal line driver section for supplying voltages obtained by sequentially sampling a video signal input thereto to the data signal lines, respectively; and
- a controller section for controlling the video signal and sampling of the video signal;
- wherein the controller section includes,
   - a display mode selecting section for selecting a display mode which specifies a position of a display area for the video signal within the display screen, and
   - a timing control section for setting a start timing and a clock for sampling based on the display mode selected by said display mode selecting section.

15. The flat-panel display device according to claim 14, wherein each horizontal scanning period for the video signal has an effective video period and a blanking period.

16. The flat-panel display device according to claim 15, wherein the video signal as another video information assigned to the blanking period.

17. The flat-panel display device according to claim 15, wherein the timing control section is constructed such that the sampling start timing is determined to cope with the effective video period and the sampling clock is determined so as to complete samplings for substantially all the data signal lines within the effective video period.

18. The flat-panel display device according to claim 15, wherein the timing control section is constructed such that the sampling start timing is determined in the blanking period between the effective video periods and the sampling clock is determined to be at a higher frequency in the blanking period than in the effective video period.

19. The flat-panel display device according to claim 18, wherein the frequency of the sampling clock is switched while the sampling is stopped.

20. A display method for displaying a first image corresponding to a first video signal in a first display mode and a second image corresponding to a second video image and having an aspect ratio lower than that of the first image in a second display mode on a display panel which has a matrix array of pixels serving as a screen and a plurality of data signal lines formed to set potentials of the pixels of each row, the method comprising the steps of:

generating an auxiliary video signal representing an auxiliary image to be displayed on at least one side of the second image within the screen of the display panel in the second display mode; and driving the data signal lines according to sampling results obtained by sampling the second video signal and the auxiliary video signal in every horizontal scanning period for the second video signal, the auxiliary video signal being sampled in a horizontal blanking period included in the horizontal scanning period and not used for sampling the second video signal.

21. The display method according to claim 20, wherein the auxiliary video signal is sampled at a frequency higher than that of the second video signal.

22. The display method according to claim 21, wherein a sampling frequency of the auxiliary video signal is equal to a sampling frequency of the first video signal when the first video signal represents the first image of an aspect ratio of 9:16 and the second video signal represents the second image of an aspect ratio of 3:4.

23. The display method according to claim 20, wherein the auxiliary video signal is sampled in response to a sampling clock signal of a first frequency and the second video signal is sampled in response to a sampling clock signal of a second frequency.

24. The display method according to claim 23, wherein each of the sampling clock signals is produced by frequency-dividing a reference sampling clock signal.

* * * * *